United States Patent
Hattori et al.

(10) Patent No.: US 7,560,885 B2
(45) Date of Patent: Jul. 14, 2009

(54) METHOD AND APPARATUS FOR CONTROLLING MOTOR

(75) Inventors: Makoto Hattori, Aichi (JP); Masahiko Asai, Aichi (JP); Takayuki Takashige, Aichi (JP)

(73) Assignee: Mitsubishi Heavy Industries, Ltd., Tokyo (JP)

( * ) Notice: Subject to any disclaimer, the term of this patent is extended or adjusted under 35 U.S.C. 154(b) by 0 days.

(21) Appl. No.: 11/239,285

(22) Filed: Sep. 30, 2005

(65) Prior Publication Data

US 2006/0186843 A1    Aug. 24, 2006

(30) Foreign Application Priority Data

Feb. 23, 2005 (JP) ............................. 2005-047855
Apr. 28, 2005 (JP) ............................. 2005-132280

(51) Int. Cl.
*H02P 6/18* (2006.01)
*H02P 6/20* (2006.01)
*H02P 6/24* (2006.01)

(52) U.S. Cl. ................... 318/430; 318/431; 318/400.01

(58) Field of Classification Search ............... 318/139, 318/400.01, 430, 431, 720, 721, 724

See application file for complete search history.

(56) References Cited

U.S. PATENT DOCUMENTS

| | | | | |
|---|---|---|---|---|
| 4,431,953 A | * | 2/1984 | Schray et al. | 318/254 |
| 4,808,893 A | * | 2/1989 | Cavanagh | 318/254 |
| 5,623,379 A | * | 4/1997 | Nishimura et al. | 360/74.1 |
| 6,104,153 A | * | 8/2000 | Codilian et al. | 318/362 |
| 6,153,989 A | * | 11/2000 | Kardash et al. | 318/400.09 |
| 2001/0045095 A1 | | 11/2001 | Kim et al. | |
| 2002/0021098 A1 | * | 2/2002 | Matsushiro et al. | 318/254 |
| 2003/0042864 A1 | | 3/2003 | Lequesne et al. | |
| 2004/0036436 A1 | * | 2/2004 | Tieu | 318/439 |
| 2004/0135528 A1 | | 7/2004 | Yasohara et al. | |
| 2007/0267996 A1 | * | 11/2007 | Shibasaki et al. | 318/696 |

FOREIGN PATENT DOCUMENTS

JP    2002-252996    9/2002

OTHER PUBLICATIONS

European Search Report dated Feb. 27, 2009, Application No. 0518237.8-2007.

* cited by examiner

*Primary Examiner*—Walter Benson
*Assistant Examiner*—Eduardo Colon-Santana
(74) *Attorney, Agent, or Firm*—Westerman, Hattori, Daniels & Adrian, LLP.

(57) ABSTRACT

An apparatus for controlling a motor includes a plurality of switching elements configured to switch energizing phases of the motor; and a driving unit configured to drive at least one of the switching elements. The driving unit drives a predetermined switching element from among the switching elements so as to position the rotor to a predetermined position. When starting the motor, the driving unit first drives the predetermined switching element.

19 Claims, 7 Drawing Sheets

U-V PHASE

FINISH DRIVING

FIG.6B

U-V PHASE

POSITION ALIGNMENT

FIG.6C

U-V PHASE

START DRIVING

FIG.8A

FINISH DRIVING

FIG.8B

POSITION ALIGNMENT

FIG.8C

START DRIVING

METHOD AND APPARATUS FOR CONTROLLING MOTOR

BACKGROUND OF THE INVENTION

1. Field of the Invention

The present invention relates to a method and an apparatus for controlling a motor, and more particularly to, a method and an apparatus for controlling a motor that reduce vibrations and noises caused when the motor is started.

2. Description of the Related Art

Generally, an apparatus for controlling a motor forcibly rotates a rotor at a fixed rotation speed when a motor is to be started, and detects a position of the rotor after a predetermined time to control the driving (the number of revolutions, etc.) of the motor. However, such a structure causes vibrations and noises when the motor is started.

A conventional technology concerning this problem is disclosed in Japanese Patent Application Laid-Open No. 2002-252996. In the conventional technology, an apparatus for controlling a synchronous motor includes a direct-current power supply, an output unit that energizes stator coils of plural phases from a direct current voltage, and an inverter device that drives the synchronous motor by switching energizing phase. The inverter device includes an inverter circuit, a control circuit, a driver that drives the inverter circuit, and a rotor data detector. The control circuit includes a starting processor, an energizing-phase setting unit, a switching unit, a speed controller, and a drive-signal generating unit. An energizing phase signal to be outputted from the starting processor to the energizing-phase setting unit includes first to third energizing patterns that are successively applied when the synchronous motor is started. There is a relationship of $T1 > T3 \geqq T2 \geqq 0$, where a first energizing period is T1, a second energizing period is T2, and a third energizing period is T3.

SUMMARY OF THE INVENTION

It is an object of the present invention to at least solve the above problems in the conventional technology.

An apparatus according to one aspect of the present invention is for controlling a motor that includes a rotor, and includes a plurality of switching elements configured to switch energizing phases of the motor; and a driving unit configured to drive at least one of the switching elements, wherein the driving unit drives a predetermined switching element from among the switching elements so as to position the rotor to a predetermined position.

A motor in a compressor for a vehicle according to another aspect of the present invention includes an apparatus according to the above aspects.

A method according to still another aspect of the present invention is a method of controlling a motor of which driving is controlled by switching energizing phases with a plurality of switching elements and that includes a rotor, and includes driving a predetermined switching element from among the switching elements so as to position the rotor to a predetermined position.

The other objects, features, and advantages of the present invention are specifically set forth in or will become apparent from the following detailed description of the invention when read in conjunction with the accompanying drawings.

DETAILED DESCRIPTION OF THE PREFERRED EMBODIMENTS

Exemplary embodiments according to the present invention will be explained in detail with reference to the accompanying drawings. The present invention is not limited to the embodiments. In addition, components in the embodiments include components that one skilled in the art can easily replace or substantially similar components. Modifications described may be arbitrarily combined within the scope obvious to one skilled in the art.

Figure 1:
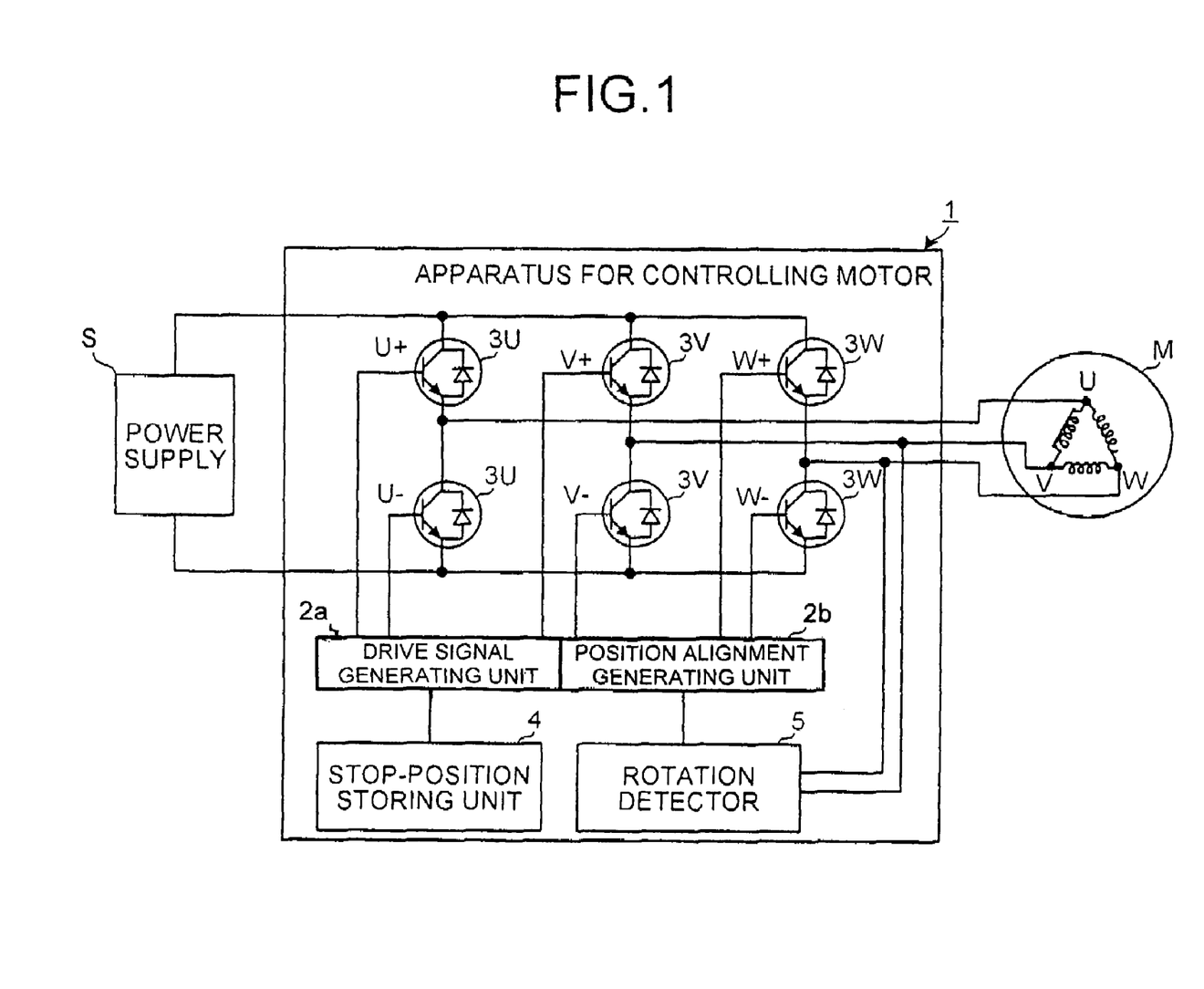
FIG. 1 is a block diagram of an apparatus for controlling a motor according to an embodiment of the invention.
Figure 2:
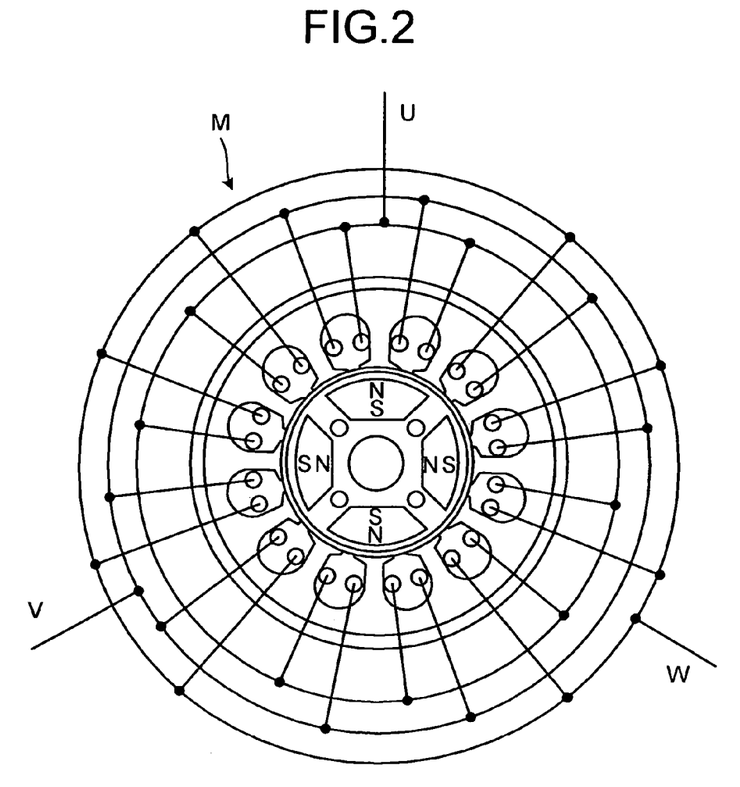
FIG. 2 is a schematic of a motor.
Figure 3:
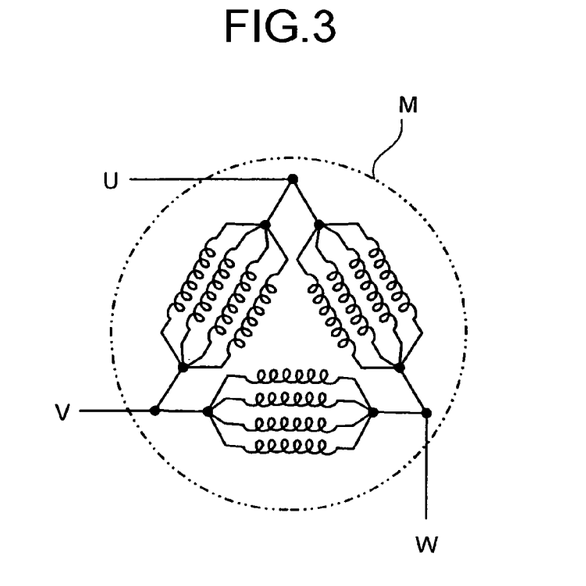
FIG. 3 is a schematic of the motor.
Figure 4:
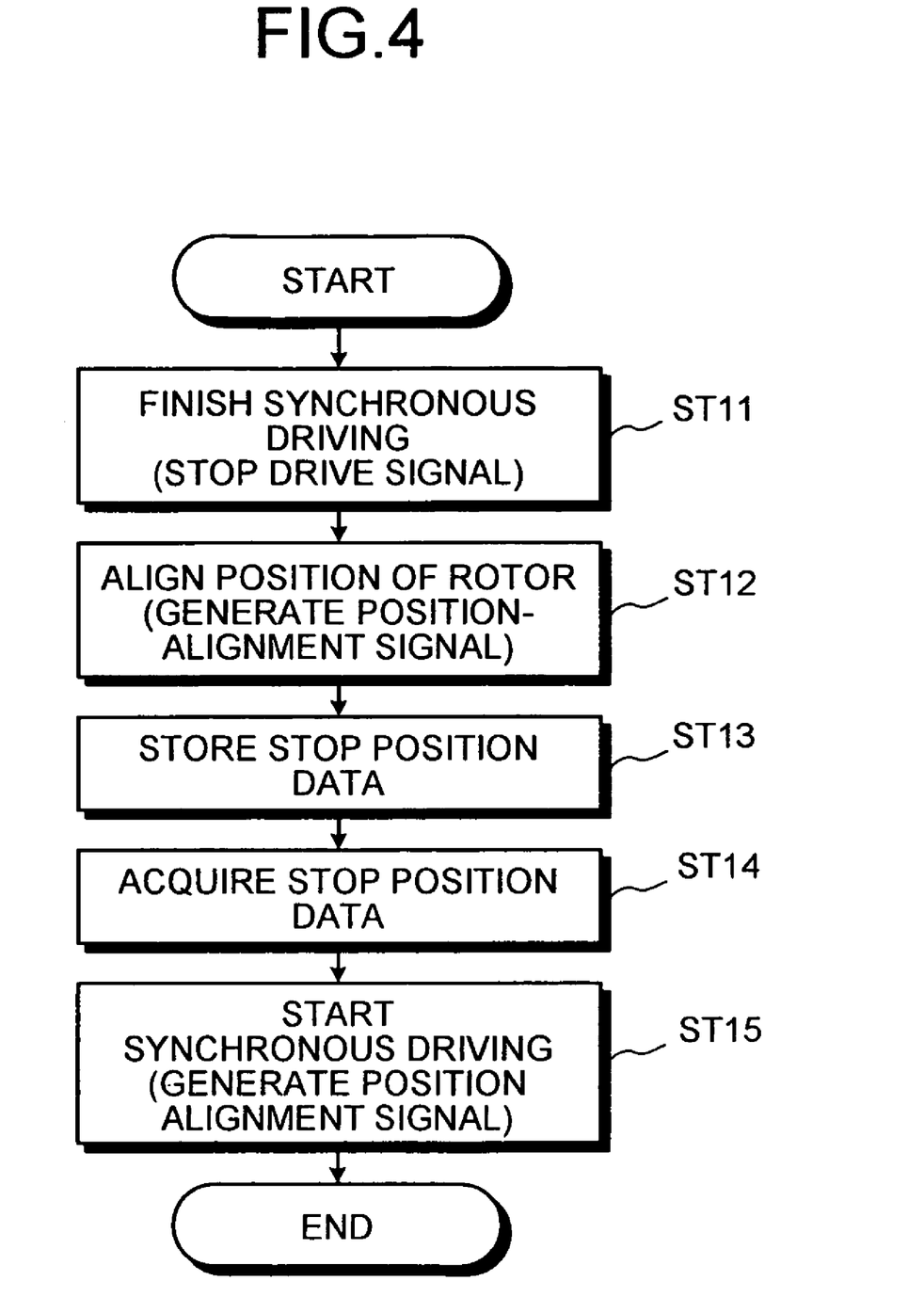
FIG. 4 is a flowchart of an action of the apparatus shown in FIG. 1.
Figure 5:
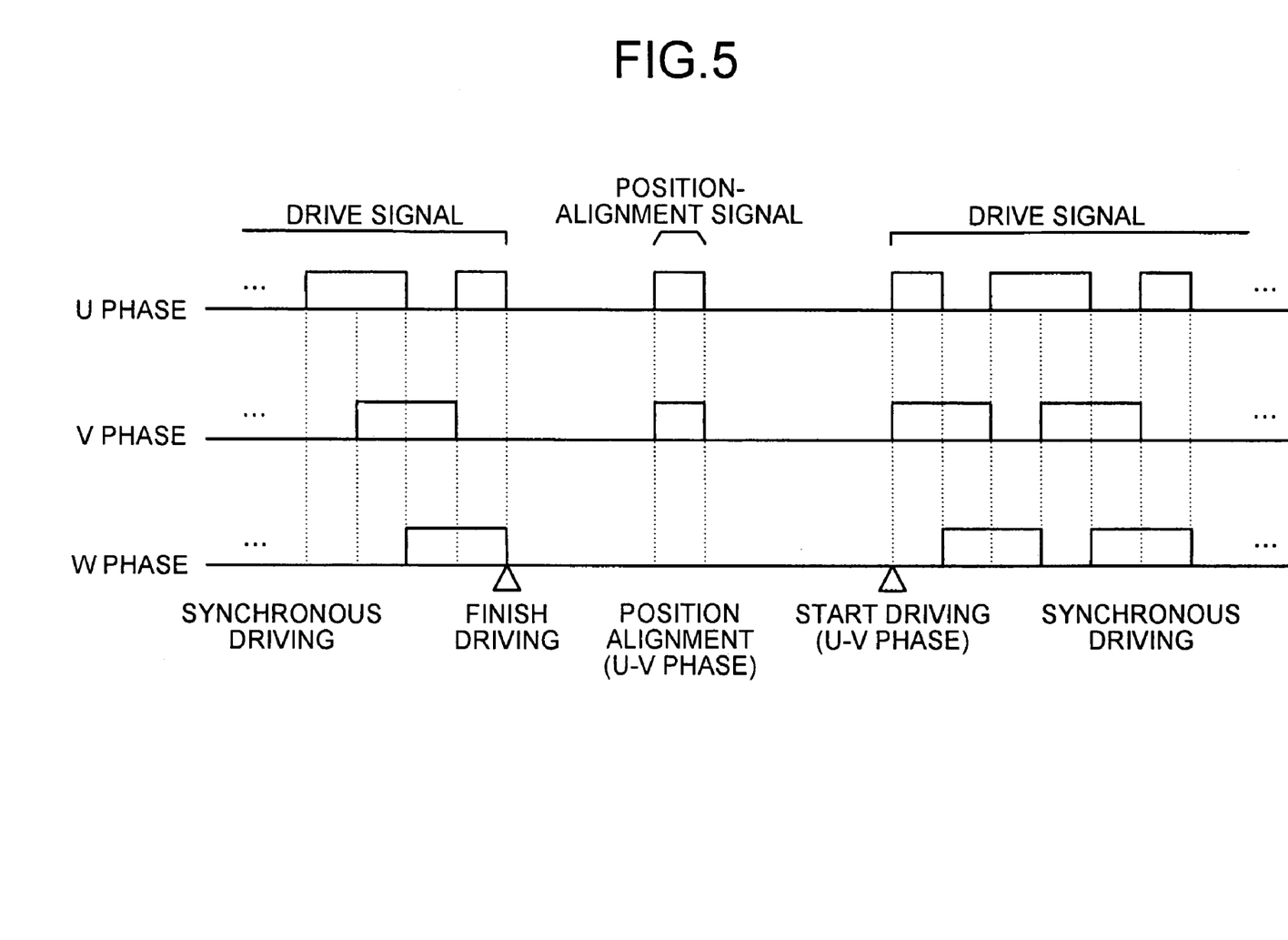
FIG. 5 is an output waveform of the apparatus shown in FIG. 1.
Figure 6A:
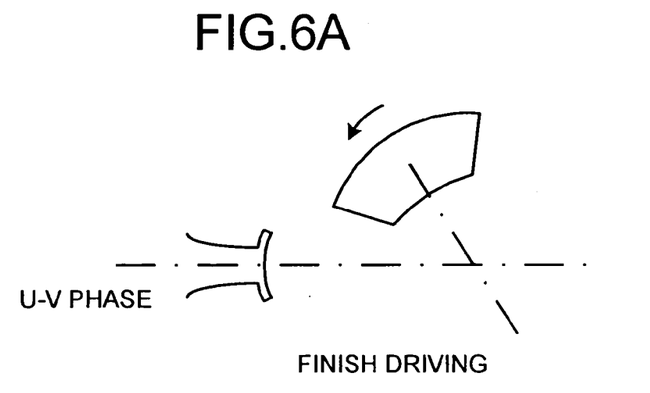
FIGS. 6A to 6C are schematics for illustrating the action of the apparatus shown in FIG. 1.
Figure 6B:
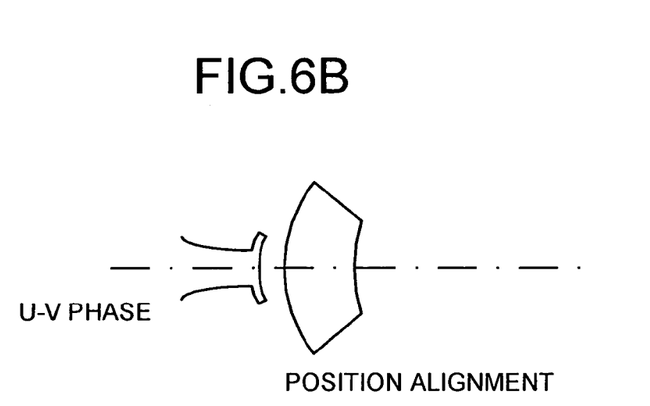
Figure 6C:
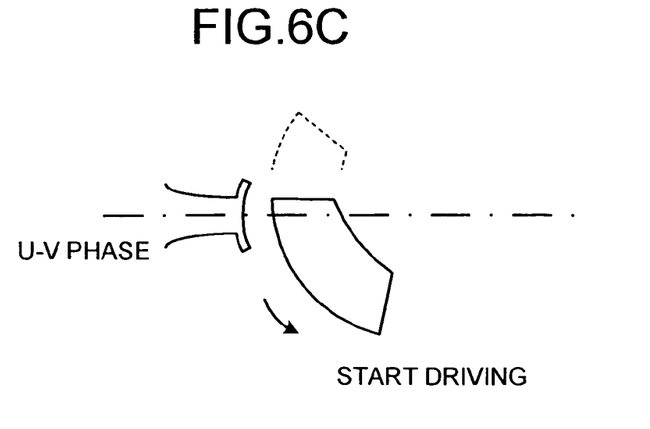

FIG. 1 is a block diagram of an apparatus for controlling a motor according to an embodiment of the invention. FIGS. 2 and 3 are schematics of a motor. FIG. 4 is a flowchart of an action of the apparatus shown in FIG. 1, FIG. 5 is an output waveform of the apparatus, and FIGS. 6A to 6C are schematics for illustrating the action of the apparatus. FIG. 7 and FIGS. 8A to 8C are schematics of for illustrating an action of a modification of the apparatus.

An apparatus for controlling a motor 1 shown in FIG. 1 controls driving of a motor (electric motor) M, and includes a drive controller 2 and a plurality of switching elements 3U to 3W (see FIG. 1 to FIG. 3). The motor M is, for example, a four-pole synchronous motor, which has plural energizing phases (U-V phase, V-W phase, and W-U phase) and is connected to the apparatus 1 and a power supply S via a three-phase bridge circuit. The drive controller 2 controls turning ON/OFF of the switching elements 3U to 3W by inputting an instruction current based on predetermined pattern data. The drive controller 2 includes a drive-signal generating unit 2a. The drive-signal generating unit generates a signal for synchronously driving the motor M. The switching elements 3U to 3W are, for example, power transistors, and are disposed corresponding to the respective energizing phases of the motor M. The switching elements 3U to 3W have a function of switching the energizing phases by being controlled to be turned ON/OFF.

In the apparatus 1, when the motor M is to be started, the drive controller 2 inputs, to the switching elements 3U to 3W, a drive signal synchronized with rotation of a rotor of the motor M. In response to the drive signal, the switching elements 3U to 3W are controlled to be turned ON/OFF. Thus, the energizing phases are successively switched to drive the motor M (see FIG. 1 through FIG. 3).

The drive controller 2 includes a position-alignment-signal generating unit 2b and a stop-position storing unit 4 (see FIG. 1). The position-alignment-signal generating unit generates a signal (position-alignment signal) for aligning a stop position of the rotor. In response to the position-alignment signal, the switching elements 3U to 3W are controlled to be turned ON/OFF, and the stop position of the rotor is aligned with a predetermined magnetic pole. The stop-position storing unit 4 has a function of storing the position-alignment signal that has been generated. This stop-position storing unit 4 is composed of, for example, a random-access memory (RAM) connected to the drive controller 2, an internal memory of the drive controller 2, or the like.

By this apparatus 1, the motor is controlled as follows (see FIG. 4 through FIG. 6).

When stopping the motor M, first, the drive controller 2 stops inputting a drive signal (step ST11). Then, the switching elements 3U to 3W are all turned OFF, and power supply to the motor M is stopped. Thus, a speed of rotation of the rotor is reduced (see FIG. 6A). Next, the drive controller 2 generates a position-alignment signal to drive the switching elements 3U to 3W, and brings the rotor at a predetermined stop position (step ST12). For example, when a magnet of the rotor is stopped at a magnetic pole of the U-V phase, the switching elements 3U and 3V corresponding to the U-V phase are driven and the magnetic pole coil of the U-V phase is excited (see FIG. 6B). Thus, the rotor is aligned in position and stops at a predetermined position (with a predetermined rotation angle). Next, data on the stop position of the rotor is stored in the stop-position storing unit 4 (step ST13). Such data includes, for example, data on the switching elements used for the rotor position alignment from among the switching elements 3U to 3W.

When starting the motor M, first, the drive controller 2 reads and acquires the data on the stop position from the stop-position storing unit 4 (step ST14). Next, the drive controller 2 generates a drive signal and drives the switching elements 3U to 3W to start the motor M (step ST15). At this point, the switching elements 3U to 3W are driven starting from a switching element corresponding to the stop position. For example, when the rotor stops at the magnetic pole of the U-V phase, excitation is started from the magnetic pole of the U-V phase (see FIG. 6C). Thus, the rotor can be smoothly started to rotate.

With the apparatus 1, when stopping the motor M, a predetermined switching element from among the switching element 3U to 3W is driven to align the stop position of the rotor, and when starting the motor M, driving of the switching elements 3U to 3W is started from a switching element corresponding to the stop position aligned. Thus, the rotor can be smoothly started, thereby reducing vibrations and noises caused at the time of starting the motor.

In addition, since the stop position is aligned when stopping the motor, noise caused by driving the rotor to align the stop position is less likely to be harsh on ears of a user compared to a case in which the stop position is aligned when starting the motor.

In this apparatus 1, it is preferable that a position of the rotor is aligned according to a state of rotation of the rotor. For example, when stopping the motor M, which is after stopping the drive signal, it is preferable that the position of the rotor is aligned when a speed of rotation of the rotor is reduced to a predetermined speed or lower. Since the position is aligned after the speed of the rotation is sufficiently reduced, or after the rotation of the rotor is stopped, the position of the rotor can be smoothly aligned.

Specifically, the apparatus 1 includes a rotation detector 5 that detects the speed of the rotation (see FIG. 1). The rotation detector 5 detects the speed by measuring an induced current generated according to the rotation. Then, after the drive controller 2 stops the drive signal, the rotation detector 5 detects the speed and transmits data on the speed detected to the drive controller 2. When the speed is reduced to a predetermined speed or lower (or to zero), the drive controller 2 generates a position-alignment signal to bring the rotor to a predetermined position.

It is preferable that the position of the rotor is aligned while the rotor is still rotating. Thus, compared to a case in which the position is aligned after the rotation is completely stopped, alignment of the position can smoothly and quickly be achieved. Furthermore, it is possible to prevent a failure in the alignment due to an improper relationship between a position of the rotor and the magnetic pole to be excited for the alignment (for example, when these positions deviate by 90 degrees).

However, the invention is not limited to this, and alignment may be performed after the rotation of the rotor is stopped.

It is also preferable that the position of the rotor is aligned after a predetermined time elapses after driving of the motor is stopped. For example, the drive controller 2 includes an internal timer (not shown) and the internal timer measures an elapsed time since the drive signal is stopped. After the predetermined time elapses (for example, after five seconds), the drive controller 2 generates a position-alignment signal. Thus, after the speed of the rotation of the rotor is sufficiently reduced or the rotation is stopped, the position can be aligned. In addition, timing of the alignment can be unambiguously determined without detecting the speed.

Moreover, for alignment of the position of the rotor, it is preferable to drive a switching element (switching element group or energizing phase) other than a switching element used for previous alignment. For example, if the switching elements 3U and 3V of the U-V phase are used for the previous alignment, the switching elements 3V and 3W (or 3W and 3U) of the V-W phase (or W-U phase) are used.

Thus, the switching elements 3U to 3W to be driven first when starting the motor M can be made different between current driving and previous driving. For example, based on data on previous stop position of the rotor stored in the stop-position storing unit 4, the drive controller 2 arbitrarily generates a position-alignment signal to select a switching element different from one used previously, or based on a predetermined position-alignment pattern, the drive controller 2 generates a position-alignment signal. Thereby, lives of the switching elements 3U to 3W become longer.

Furthermore, when the motor M is driven for more than one time, it is preferable that the position-alignment signal is regulated so that frequency in use of each of the switching elements 3U to 3W for the alignment becomes substantially equal to each other among the switching elements 3U to 3W. For example, data on the stop position is accumulated in the stop-position storing unit 4, and based on the data accumulated, the drive controller 2 arbitrarily generates a position-alignment signal so that the frequency becomes substantially even among the switching elements 3U to 3W. Alternatively, based on a position-alignment pattern regulated in advance so that the frequency becomes substantially even, the drive controller 2 generates a position-alignment signal. Thus, lives of the switching elements 3U to 3W become longer.

Figure 7:
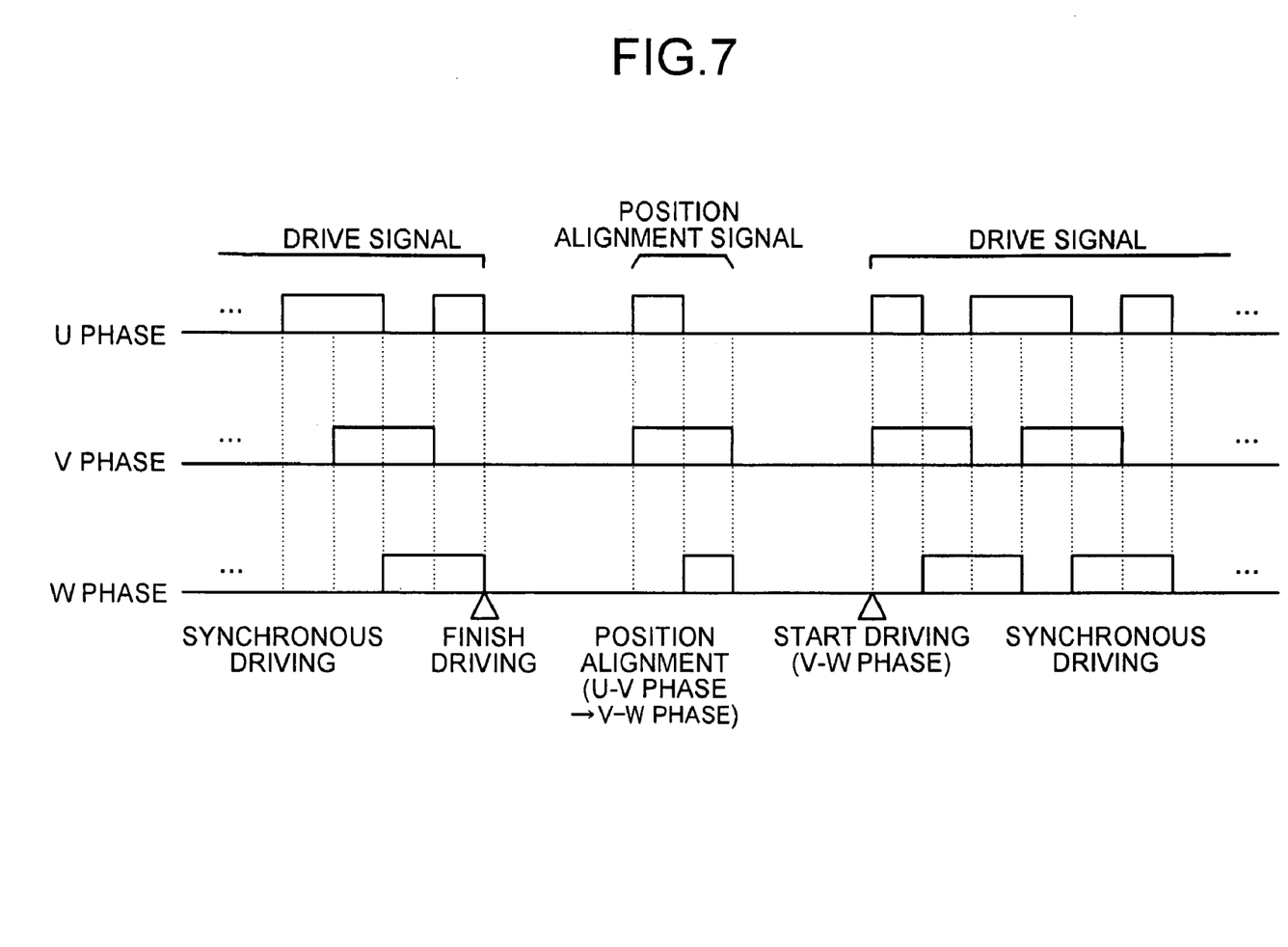
FIG. 7 is an output waveform of a modification of the apparatus shown in FIG. 1.
Figure 8A:
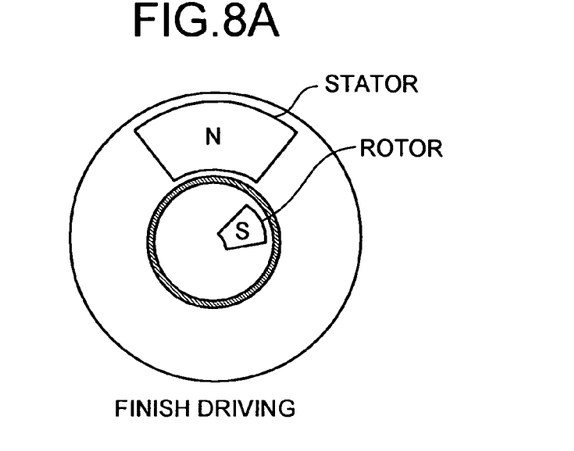
FIGS. 8A to 8C are schematics for illustrating an action of a modification of the apparatus shown in FIG. 1.
Figure 8B:
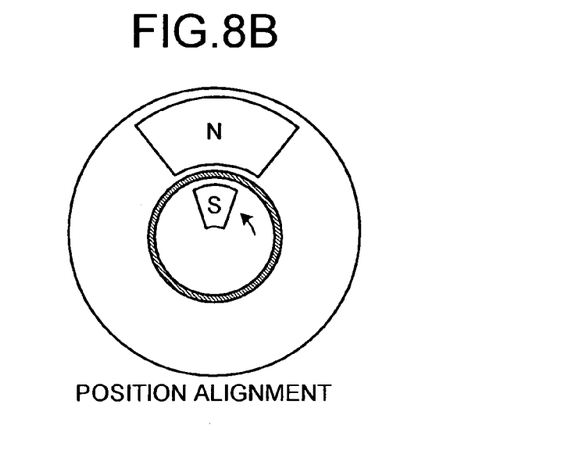
Figure 8C:
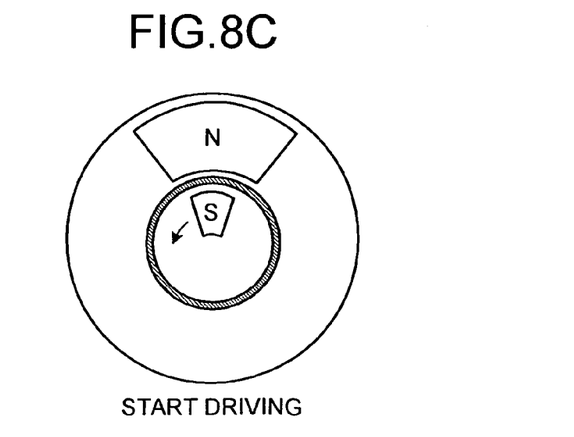

Moreover, it is preferable that the stop position of the rotor is aligned by switching the energizing phases by stages (in two stages or three stages) by driving the switching elements 3U to 3W for plural times (see FIG. 7). For example, after the switching elements 3U and 3V of the U-V phase are driven, the switching elements 3U and 3V of a different phase of the V-W phase are driven. Thus, the energizing phases are switched in two stages from the U-V phase to the V-W phase, thereby the stop position is aligned. Thus, the stop position of the rotor is aligned without fail.

In this apparatus 1, the stop position is aligned when driving of the motor is stopped. However, without limitation to this, it may also be configured that the stop position is aligned before driving of the motor is started (see FIG. 4, FIG. 5, and FIGS. 8A to 8C). When the rotor is stopped at an arbitrary position after the driving of the motor is stopped (see FIG. 8A), a predetermined switching element is driven to align the stop position of the rotor before starting the motor (step ST12) (see FIG. 8B). Then, to start the motor, the switching elements are driven starting from a switching element used for previous alignment. Thus, synchronous driving of the motor is started (step ST15) (see FIG. 8C). The rotor is smoothly started, thereby reducing vibrations and noises caused when starting the motor. Modifications describe above are also applicable to this structure within the scope obvious to one skilled in the art.

This apparatus 1 is applicable not only to the three-phase synchronous motor but also to, for example, a five-phase synchronous motor. The apparatus 1 is applicable not only to a four-pole synchronous motor but also to a six- or eight-pole synchronous motor. The apparatus 1 is applied to, for example, a motor M of a compressor of an in-vehicle air conditioning system. It is preferable that the power supply S is commonly used as a power supply (battery) of a vehicle-running motor (not shown).

Particularly, when the apparatus 1 is applied to the motor M of an electrical compressor of a vehicle, vibrations and noises when starting the motor M are reduced as described above, so that discomfort for a user (vehicle occupant) due to a starting noise of the motor M is reduced and an upscale image of the vehicle is increased.

This apparatus 1 is also applicable to, for example, an electrical vehicle, a hybrid car, and a full-cell-powered vehicle.

According to the present invention, a rotor of a motor is smoothly started to rotate, thereby, reducing vibrations and noises caused when starting the motor.

Although the invention has been described with respect to a specific embodiment for a complete and clear disclosure, the appended claims are not to be thus limited but are to be construed as embodying all modifications and alternative constructions that may occur to one skilled in the art which fairly fall within the basic teaching herein set forth.

What is claimed is:

1. An apparatus for controlling a motor applied to an electrical compressor of a vehicle, the apparatus comprising:
    a rotor
    a plurality of switching elements configured to switch energizing phases of the motor successively for driving the motor; and
    a drive controller configured to drive at least one of the switching elements, wherein
        when the motor the drive controller is configured to drive a predetermined switching element used for the latest alignment of the rotor, wherein
        when stopping the motor the drive controller is further configured to align the rotor to a predetermined position by driving a predetermined switching element excluding the switching element used for the latest alignment, wherein the drive controller includes:
        a drive signal generating unit configured to generate a signal synchronized with rotation of the rotor of the motor;
        a position-alignment-signal generating unit configured to generate a position-alignment signal for aligning a stop position of the rotor, wherein the stop position of the rotor is configured to be aligned, as a part of stopping procedure of the motor, after a predetermined time elapses after driving of the motor is stopped; and
        a stop-position storing unit for storing the position-alignment signal generated by the position-alignment signal generating unit.

2. The apparatus according to claim 1, wherein the drive controller drives the predetermined switching element after driving of the motor is stopped.

3. The apparatus according to claim 1, wherein the drive controller drives the predetermined switching element before starting the motor.

4. The apparatus according to claim 1, wherein when starting the motor, the drive controller first drives the predetermined switching element.

5. The apparatus according to claim 1, wherein the driving unit drives the predetermined switching element when a speed of rotation of the rotor is reduced to a predetermined speed or lower.

6. The apparatus according to claim 1, wherein the driving unit drives the predetermined switching element after a predetermined time elapses after the driving of the motor is stopped.

7. The apparatus according to claim 1, wherein the predetermined switching element is a switching element other than a switching element driven to position the rotor at a previous time.

8. The apparatus according to claim 1, wherein frequency in use of each of the switching elements to position the rotor is controlled to be substantially equal to each other.

9. The apparatus according to claim 1, wherein the driving unit drives a plurality of predetermined switching elements in stages from among the switching elements so as to position the rotor to a predetermined position.

10. A motor in a compressor for a vehicle comprising an apparatus for controlling a motor applied to an electrical compressor of a vehicle according to claim 1, wherein the motor is a multi-pole synchronous motor.

11. A method of controlling a motor applied to an electrical compressor of a vehicle of which driving is controlled by switching energizing phases successively with a plurality of switching elements and that includes a rotor, the method comprising:
    starting the motor by driving a predetermined switching element used for the latest alignment of the rotor,
    stopping the motor by aligning the rotor to a predetermined position; by driving a predetermined switching element excluding the switching element used for the latest alignment;
    generating a signal synchronized with rotation of the rotor of the motor;
    generating a position-alignment signal for aligning a stop position of the rotor; and
    storing the position-alignment signal generated.

12. The method according to claim 11, wherein the driving includes driving the predetermined switching element after driving of the motor is stopped.

13. The method according to claim 11, wherein the driving includes driving the predetermined switching element before starting the motor.

14. The method according to claim 11, wherein the driving includes driving the predetermined switching element first, when starting the motor.

15. The method according to claim 11, wherein the driving includes driving the predetermined switching element when a speed of rotation of the rotor is reduced to a predetermined speed or lower.

16. The method according to claim 11, wherein the driving includes driving the predetermined switching element after a predetermined time elapses after the driving of the motor is stopped.

17. The method according to claim 11, wherein the predetermined switching element is a switching element other than a switching element driven to position the rotor at a previous time.

18. The method according to claim 11, wherein frequency in use of each of the switching elements to position the rotor is controlled to be substantially equal to each other.

19. The method according to claim 11, wherein
    the driving includes driving a plurality of predetermined switching elements in stages from among the switching elements so as to position the rotor to a predetermined position.

* * * * *